US010423836B2

(12) United States Patent
Sugaya

(10) Patent No.: US 10,423,836 B2
(45) Date of Patent: Sep. 24, 2019

(54) INFORMATION PROVIDING SYSTEM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/567,745

(22) PCT Filed: Jun. 16, 2016

(86) PCT No.: PCT/JP2016/067912
§ 371 (c)(1),
(2) Date: Oct. 19, 2017

(87) PCT Pub. No.: WO2017/216920
PCT Pub. Date: Dec. 21, 2017

(65) Prior Publication Data
US 2019/0130195 A1 May 2, 2019

(51) Int. Cl.
G06K 9/00 (2006.01)
G06Q 50/10 (2012.01)
G01W 1/10 (2006.01)
G06F 17/18 (2006.01)
G01W 1/14 (2006.01)
G01W 1/00 (2006.01)

(52) U.S. Cl.
CPC ......... *G06K 9/00771* (2013.01); *G01W 1/10* (2013.01); *G01W 1/14* (2013.01); *G06F 17/18* (2013.01); *G06K 9/00369* (2013.01); *G06Q 50/10* (2013.01); *G01W 2001/006* (2013.01); *G01W 2203/00* (2013.01)

(58) Field of Classification Search
CPC . G06K 9/00771; G06K 9/00369; G01W 1/10; G01W 2001/006; G01W 2203/00; G06F 17/18
USPC .......................................... 382/103
See application file for complete search history.

(56) References Cited

U.S. PATENT DOCUMENTS

| 5,729,471 | A | * | 3/1998 | Jain | H04N 13/139 725/131 |
| 6,748,326 | B1 | * | 6/2004 | Noma | A63F 13/12 463/40 |
| 9,465,987 | B1 | * | 10/2016 | Bell | G06K 9/00798 |
| 10,158,975 | B2 | * | 12/2018 | de Barros Chapiewski | H04W 4/029 |
| 2005/0276447 | A1 | * | 12/2005 | Taniguchi | G06K 9/00362 382/103 |
| 2009/0018711 | A1 | * | 1/2009 | Ueda | G08G 1/165 701/1 |

(Continued)

FOREIGN PATENT DOCUMENTS

JP 2002148061 A * 5/2002
JP 2005-345293 12/2005

(Continued)

*Primary Examiner* — Jonathan S Lee
(74) *Attorney, Agent, or Firm* — Lex IP Meister, PLLC

(57) ABSTRACT

An information providing system 10 includes an acquiring unit 210 that acquires an image captured by an imaging unit (a camera 100-1, a camera 100-2, and a camera 100-3) via a network, an analyzing unit 220 that analyzes the image to generate at least situation information indicating whether a captured person carries a rain gear, and a display control unit 240 and 320 that displays the situation information on a user terminal.

20 Claims, 14 Drawing Sheets

(56) References Cited

U.S. PATENT DOCUMENTS

| | | | | |
|---|---|---|---|---|
| 2011/0074955 A1* | 3/2011 | Kuehnle | ................. | G01W 1/14 |
| | | | | 348/148 |
| 2015/0117790 A1* | 4/2015 | Kamiya | ............. | G06K 9/00221 |
| | | | | 382/203 |
| 2016/0379067 A1* | 12/2016 | May | ........................ | H04N 7/18 |
| | | | | 382/103 |

FOREIGN PATENT DOCUMENTS

| | | | |
|---|---|---|---|
| JP | 2007085864 A | * | 4/2007 |
| JP | 2011-76142 | | 4/2011 |
| JP | 2014-192910 | | 10/2014 |
| JP | 2016-38703 | | 3/2016 |

\* cited by examiner

FIG. 3

| Camera ID | Installation Location | Image Data | Photographing Time | Analysis Result |
|---|---|---|---|---|
| 001 | (East longitude xxxxxx North latitude xxxxxx) ⟨Station A⟩ | Image012.jpeg | 2016.6.1 13:05 | None |
| | | Image013.jpeg | 2016.6.1 13:02 | Usage rate 50%, Number of people |
| | | ... | ... | ... |
| 002 | (East Longitude xxxxxx North Latitude xxxxxx) ⟨Tokyo, B-ku⟩ | Image111.jpeg | 2016.6.1 13:06 | None |
| | | ... | ... | ... |
| | | ... | ... | ... |
| ... | ... | ... | ... | ... |

INFORMATION PROVIDING SYSTEM

TECHNICAL FIELD

The present invention relates to a technique for providing information on weather to a user.

BACKGROUND ART

There is a system in which a server collects weather information measured at a plurality of places via a network and provides weather information corresponding to a position of a user to a terminal device (Patent Document 1).

PRIOR ART DOCUMENT

Patent Document

Patent Document 1: Japanese Patent Application Publication No. 2011-76142

SUMMARY OF THE INVENTION

Technical Problem

Generally, weather information is acquired in order to decide an action (such as whether rain gear should be carried or not) depending on weather. For example, if a person, who cannot confirm an outdoor situation such as being indoors, acquires weather information indicating that there is heavy rain in an area where the person is, the person determines that he or she should go out with an umbrella.

Here, when determination is performed based only on the weather information, there are cases that the user feels that he or she could not take appropriate action as a result. For example, in a case of acquiring information that light rain is falling, some users may determine that an umbrella is necessary because it is raining. However, because light rain is falling like mist when they actually go out with carrying the umbrella, they may regret that they carry the umbrella. On the contrary, some users may determine that there is no problem even if going out without carrying the umbrella when the light rain is falling. However, because an amount of rain more than the user's imagination is falling when they actually go out, they may regret that they go out without carrying the umbrella.

The present invention aims to assist in determining whether a user should prepare a rain gear.

Technical Solution

According to one aspect of the present invention, there is provided an information providing system including an acquiring unit that acquires an image captured by an imaging unit via a network, an analyzing unit that analyzes the image to generate situation information at least indicating that a captured person carries a rain gear, and a display control unit that displays the situation information on a user terminal.

Effects of the Invention

According to the present invention, it is supported to determine whether the user should prepare the rain gear.

BRIEF DESCRIPTION OF THE DRAWINGS

FIG. 3 shows an example of information stored in a server 200.

DESCRIPTION OF REFERENCE NUMBERS

100: camera, 200: server, 300: user terminal, 901: network, 901: relay device, 400: weather database, 210: first acquiring unit, 220: analyzing unit, 230: storage unit, 240: transmitting unit, 250: second acquiring unit, 310: communication unit, 320: display control unit, 330: display unit, 340: designation unit, 350: storage unit

DETAILED DESCRIPTION OF THE EMBODIMENTS

Figure 1:
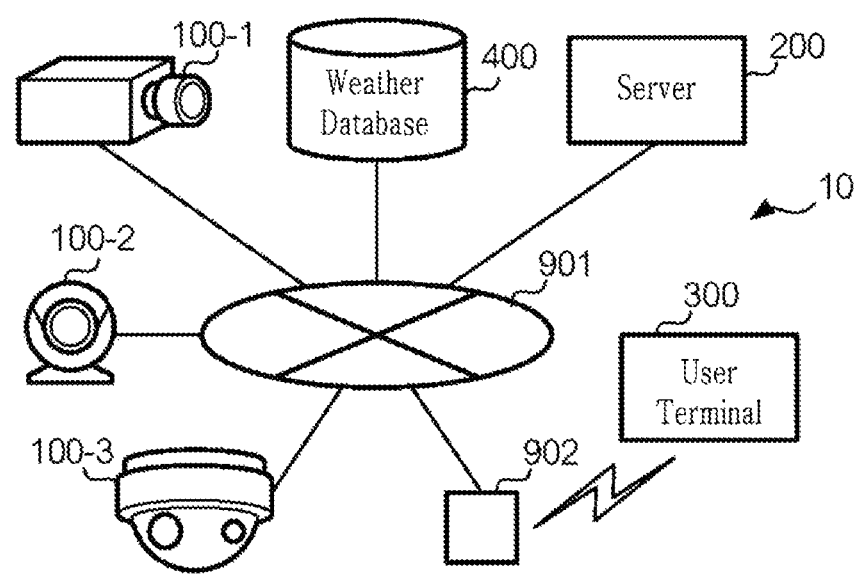
FIG. 1 shows an outline of an information providing system 10

FIG. 1 shows an outline of an information providing system 10. The information providing system 10 includes cameras 100, a server 200, a user terminal 300, and a weather database 400. The cameras 100, the server 200, and the weather database 400 are connected to each other via a network 901. The user terminal 300 is connected to the server 200 via a relay device 902 and the network 901. The network 901 is, for example, the Internet. The relay device 902 is, for example, a base station or a wireless router.

The cameras 100 include a camera 100-1, a camera 100-2, and a camera 100-3. The cameras 100 are a plurality of network cameras installed at different places, respectively, and each of them has a function for transmitting a capturing position and a captured image to the server 200 via the relay device 902. The installation locations are, for example, a station, a commercial facility, a road, and a public facility. The number of cameras 100 shown in the figure is an example. In addition, the cameras 100 may have the same or different purposes (a security purpose, a fixed point observation purpose, a public purpose, a commercial purpose), functions, and performances (an image quality, a zoom function, a panning function, a data transfer capability, etc.). Further, the camera 100 may not need to be fixed and may be a mobile terminal. For example, when the user terminal 300 is a device with a camera function, the user terminal 300 may provide the function of the camera 100.

Preferably, capturing and a transmission of image data are executed at predetermined time intervals or at preset timings. Alternatively, when a predetermined event (for example, an event in which there is a request from the server 200 or an event in which a sensor provided in the camera 100 detects predetermined information) occurs, the capturing and the transmission of image data may be executed.

The weather database 400 is operated by a private enterprise, a country or a municipality, and is a database that accumulates weather information at any time and provides the weather information according to a request. The weather information is current or future weather, and is, for example, information represented by an amount of rainfall, a temperature, a sea surface temperature, a wind direction, a wind speed, humidity, an atmospheric pressure, a wave height, a solar radiation amount, an amount of ultraviolet radiation, an air pollution degree, an amount of scattered pollen, or the like.

Figure 2:
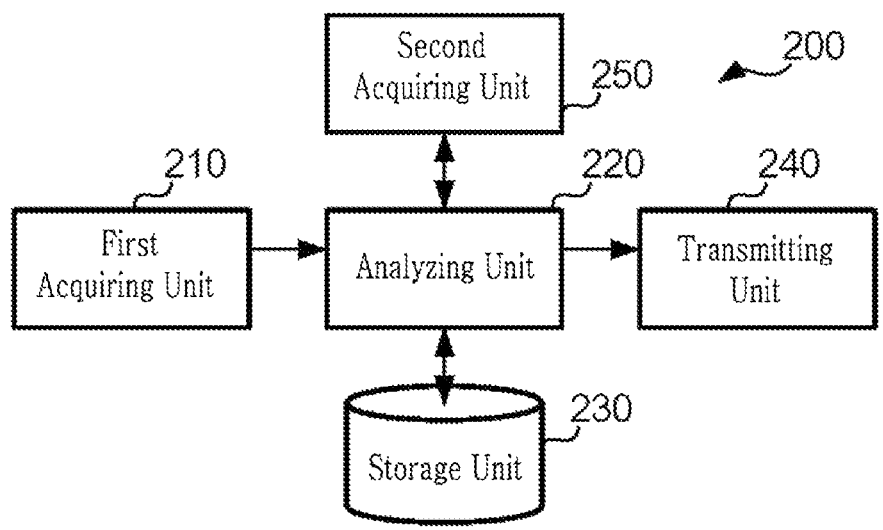
FIG. 2 is a functional block diagram of a server 200.

FIG. 2 is a functional block diagram of a server 200. The server 200 is an information processing apparatus, and includes a first acquiring unit 210, an analyzing unit 220, a storage unit 230, a transmitting unit 240, and a second acquiring unit 250.

The storage unit 230 is a storage device such as a program, a semiconductor memory, a hard disk, or the like, and stores a program which is executed by the analyzing unit 220 to realize the function of the server 200.

The first acquiring unit 210 is implemented as a communication interface, and acquires an image captured by each camera 100 via the network 901. For example, the first acquiring unit 210 may acquire a plurality of images obtained by capturing the same point within a predetermined period from the same camera 100. The acquired image is stored in the storage unit 230. When a certain period has passed after the image is stored, that image may be deleted.

The analyzing unit 220 is realized by one or more processors such as a general purpose processor, such as a central processing unit (CPU), a processor for image processing, or the like. The analyzing unit 220 analyzes an image according to a predetermined algorithm to at least determine whether people is included and determine whether each person has a rain gear, and generates situation information for at least representing that the captured person possesses the rain gear. For example, the analyzing unit 220 registers a feature amount of a shape of an umbrella in an opened state and a feature amount of a shape of the umbrella in the closed state, and performs matching the registered feature amounts with a feature amount extracted from the image.

Here, a rain gear is a tool (for example, an umbrella (a long umbrella, a folding umbrella)) carried by a user or an object (a rain coat, a poncho, a rain boots, a hat, etc.) to be worn by the user, depending on the weather. In other words, the rain gear is not only for protecting a body from rain but also for preparing various weather phenomena such as snow, rain, hail, etc. In another embodiment, the analyzing unit 220 detects the possession and use state of a parasol for protecting the body from solar radiation not the umbrella.

The situation information is represented by a numerical value, a text, an image, or the like, and includes, for example, information indicating a ratio of persons carrying umbrellas among a plurality of captured persons. Alternatively, the situation information may include information indicating whether a person carrying an umbrella is using the umbrella. Alternatively, the situation information may include the acquired image or an image obtained by processing the image. Alternatively, the situation information may include a state of a rain gear being used (such as an angle of the umbrella, a degree of deflection, whether it is blown, a degree in which it flies in the wind, etc.).

The analyzing unit 220 may select one or more cameras 100 corresponding to a location designated by the user terminal 300 and may generate the situation information based on the image acquired from the selected camera 100. Further, the analyzing unit 220 may generate the situation information on a point on a route including a plurality of positions designated by the user terminal 300. Furthermore, the analyzing unit 220 may analyze the acquired image to generate rainfall information indicating the degree of rainfall. The degree of rainfall is determined, for example, by determining the degree of wetting in the ground by an image analysis. In addition, the analyzing unit 220 analyzes a plurality of images captured at the same point, thereby generating the situation information at a plurality of viewpoints in the same capturing point. Moreover, when the situation information at a plurality of points is generated, the server 200 may perform statistical processing on the generated situation information.

The second acquiring unit 250 is implemented as a communication interface, and acquires the weather information from the weather database 400 via the relay device 902.

The transmitting unit 240 is implemented as a communication interface, and transmits the situation information generated by the analyzing unit 220 and the weather information acquired by the second acquiring unit 250 to the user terminal 300.

FIG. 3 shows an example of information stored in a storage unit 230. A camera ID, an installation location, and a capturing time are associated with all image data stored in the storage unit 230. In addition, when analysis is performed on the image data, the analysis result is further stored. The camera ID is information for uniquely identifying each camera. The installation location is represented by, for example, latitude and longitude or a landmark in the vicinity in a case of one point, and may represent an area (a range of position coordinates) or a route (a set of a plurality of position coordinates) to which the position belongs. A hierarchical relationship (for example, Kanto>Tokyo>Shinjuku-ku) may be registered in this area information.

Here, the image data may be a still image or a moving image. The analysis result is information which is analyzed by the analyzing unit 220 and can be used for generating the situation information to be provided to the user terminal 300. In the figure, the analysis has already been executed for "image013.jpeg" acquired from the camera 100 of the ID "001" installed at the station A such that the analysis result of "the number of persons using the umbrella is ten and five persons that are half of ten persons are acknowledged to use the umbrellas" ("usage rate of umbrella is 50%") is generated. The analysis has not been executed for "image012.jpeg".

Figure 4:
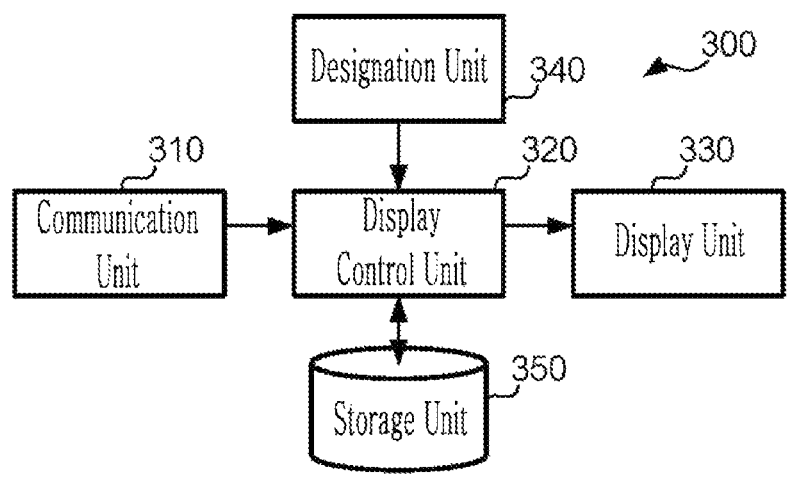
FIG. 4 is a functional block diagram of a user terminal 300.

FIG. 4 is a functional block diagram of a user terminal 300. The user terminal 300 is a general-purpose information processing terminal such as a smartphone, a mobile phone, a tablet mobile terminal, a fixed terminal, a personal computer (PC), or the like. The user terminal 300 includes a communication unit 310, a display control unit 320, a display unit 330, a designation unit 340, and a storage unit 350. The communication unit 310 is an interface for performing wireless communication according to 3G, Wi-Fi, Bluetooth®, or the like. The communication unit 310 may have a function for connecting to the relay device 902 via a wired line such as a LAN, or the like.

The display unit 330 is a display device such as a liquid crystal display, a touch panel, or the like, and displays situation information under a control of the display control unit 320.

The storage unit 350 is a storage device such as a semiconductor memory, a hard disk, or the like, and stores not only an application program for displaying a screen based on information provided from the server 200 but also a map display application program, a moving image play application program, and the like that are executed in cooperation with the application program as necessary. These programs are executed by the display control unit 320. In addition, the storage unit 350 stores user information (age, sex, other attributes of the user, current location information, contact information of other users, etc.).

The designation unit 340 is an input device that accepts designation of a position from a touch panel, a mouse, a keyboard, or a user.

The display control unit 320 is implemented as one or more processors such as a CPU, a general-purpose processor, an image processing processor, or the like, and executes one or more application programs stored in the storage unit 350. The display control unit 320 generates image data based on the situation information acquired from the server 200 and supplies the image data to the display unit 330. For example, the display control unit 320 displays a map corresponding to one or more positions (points, areas, or routes) designated by the designation unit 340, and also displays the situation information on the map in a superposed manner. Further, when rainfall information is included in the situation information acquired from the server 200, the display control unit 320 may display the rainfall information together. The display control unit 320 may display the information on weather acquired from the weather database 400 on the user terminal in addition to the situation information. Furthermore, the display control unit 320 may edit the situation information acquired from the server 200 based on the user information stored in the storage unit 350 or information inputted by the designation unit 340. The one or more application programs are, for example, downloaded via the network 901 and installed in the user terminal 300.

Figure 5:
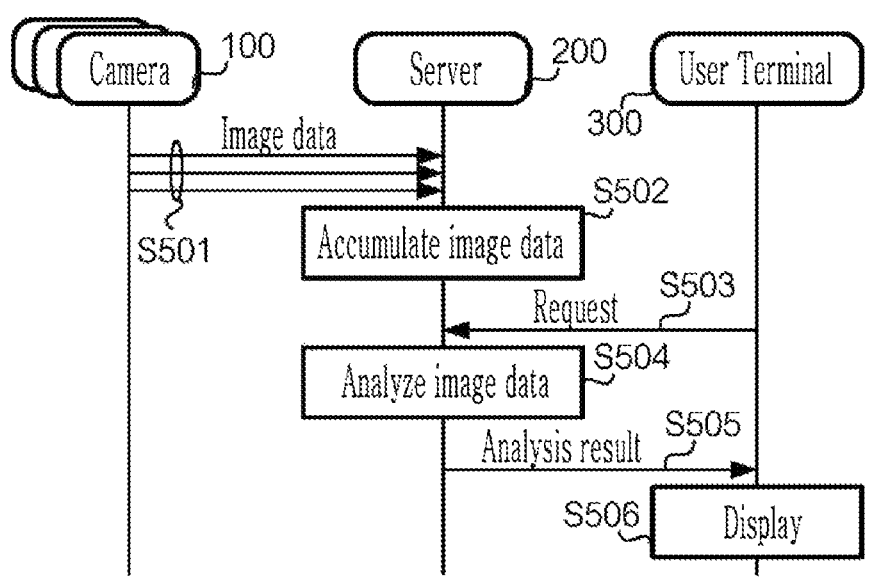
FIG. 5 shows an example of an operation of an information providing system 10.

FIG. 5 shows an example of an operation of an information providing system 10. Each camera 100 transmits an image captured at a preset timing to a server 200 at a preset timing (S501). The server 200 sequentially accumulates the acquired images (S502). A user of a user terminal 300 activates an application program and performs a predetermined operation such as an operation of inputting a position, thereby requesting the server 200 for situation information (S503). Designation of the position may be automatically generated by a user terminal 300, based on a GPS function (not shown) provided in the user terminal 300 or based on information on the position included in schedule data stored in a storage unit 350. Upon accepting the request from the user terminal 300, the server 200 analyzes the stored image to generate at least the situation information indicating whether the captured person carries a rain gear (S504). The generated situation information is transmitted from the server 200 to the user terminal 300 (S505). Drawing data are generated by a display control unit 320 based on the acquired situation information, and an image based on the drawing data is displayed on a display unit 330 (S506).

Figure 6:
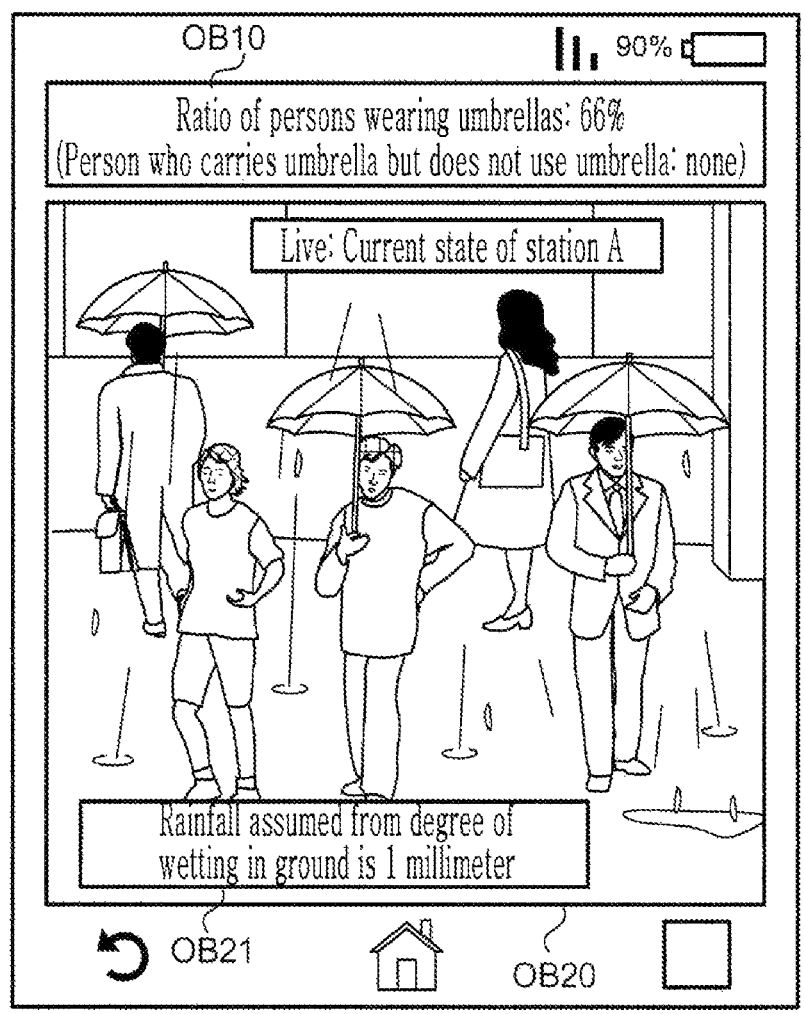
FIG. 6 shows an example (example 1) of information displayed on a display unit 330.

FIG. 6 shows an example of information displayed on a display unit 330 when an analyzing unit 220 generates situation information based on only one camera 100. In this example, an object OB10, an object OB20, and an object OB21 are displayed on a display screen. The object OB21 is an image captured by one camera 100. The object OB10 is a message generated based on the generated situation information. In addition, in this example, a result of generating rainfall information by an image analysis in an analyzing unit 220 is displayed as the object OB21. When a plurality of positions are designated from the designation unit 340, a display control unit 320 may display a plurality of images acquired from a server 200 at the same time or in turn.

According to this example, it is possible to decide whether to prepare a rain gear with reference to images reflecting dressings or behaviors of the other persons. In particular, the more persons are reflected, the more reliable the situation information becomes. Further, since the dressings or behaviors of other persons are indicated as an objective numerical value, the use's determination is supported. Furthermore, in a relationship between possession and use of the rain gear, it is also possible to guide, from a situation that there is a person who carries the umbrella but does not wear it, the user's determination that there is no need to carry umbrella since it is the amount of rain that can be externally tolerated. As such, even in a subtle weather condition which is difficult to be provided by conventional weather information, the user can make a more appropriate determination when deciding the user's next action such as whether to prepare the rain gear, by providing the image or information analyzed from the image to the user.

Figure 7:
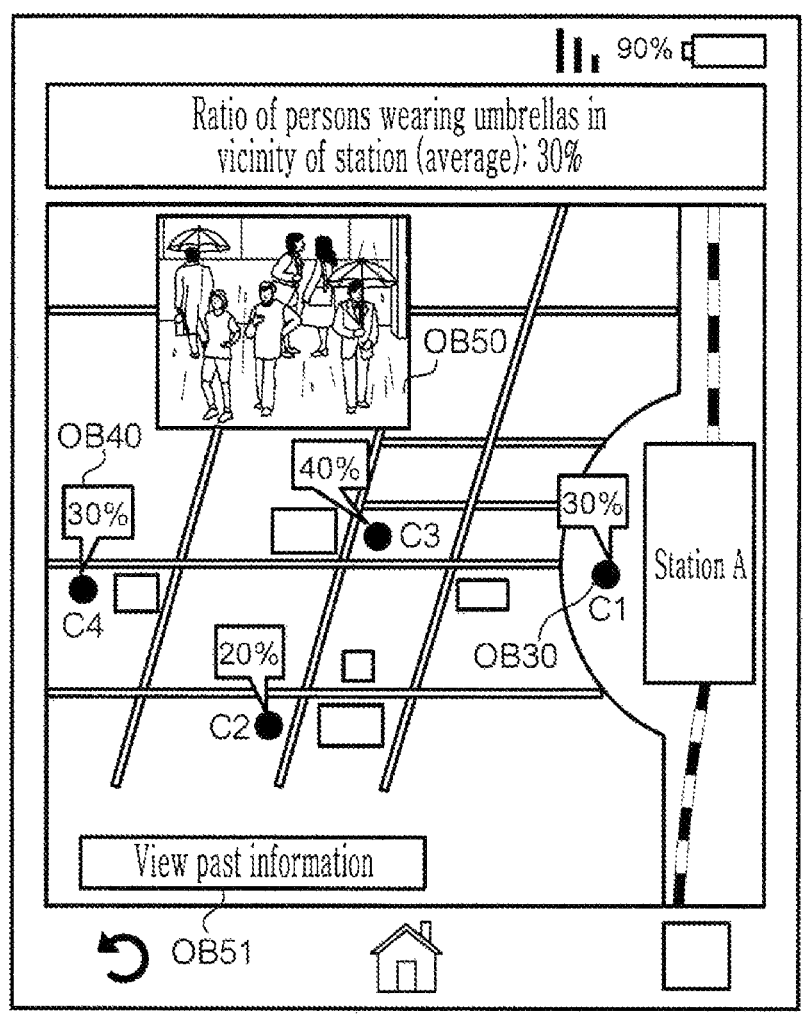
FIG. 7 shows an example (example 2) of information displayed on a display unit 330.

FIG. 7 shows another example of information displayed on a display unit 330. In this example, for example, if a user activates a map display application program and designates "station A", a request including landmark information of "station A" or position coordinates of the station A is transmitted to a server 200. An analyzing unit 220 performs image analysis on each of images acquired from cameras 100 associated with the designated position to generate status information. Upon receiving the status information from the server 200, a display control unit 320 displays objects OB30 representing positions C1, C2, C3, and C4 of the cameras 100 on a map, and also displays on the map the situation information (in this case, a usage rate of umbrellas), which is generated for each camera 100 by the analyzing unit 220, as objects OB40. In this state, if the user designates, for example, the position C3 by a tapping operation or the like, detailed situation information object OB50 of the position C3 (the image captured by C3 in the example of FIG. 7) is displayed. According to this example, the user can easily understand the difference in weather which varies according to the locations.

In a case where the analyzing unit 220 performs the analysis on each of a plurality of images with different capturing time points, or a case where the server 200 acquires weather information according to the plurality of time points from a weather database 400, if an object OB51 is tapped in FIG. 7, the display control unit 320 may display information acquired from the server 200 in chronological order. In the example shown in FIG. 8, the transition of the rainfall at a point corresponding to one camera 100 provided near the station A is displayed. In this case, a designation unit 340 may accept designation of a desired period in addition to the position. According to this example, the user can predict future weather from past information.

Figure 9:
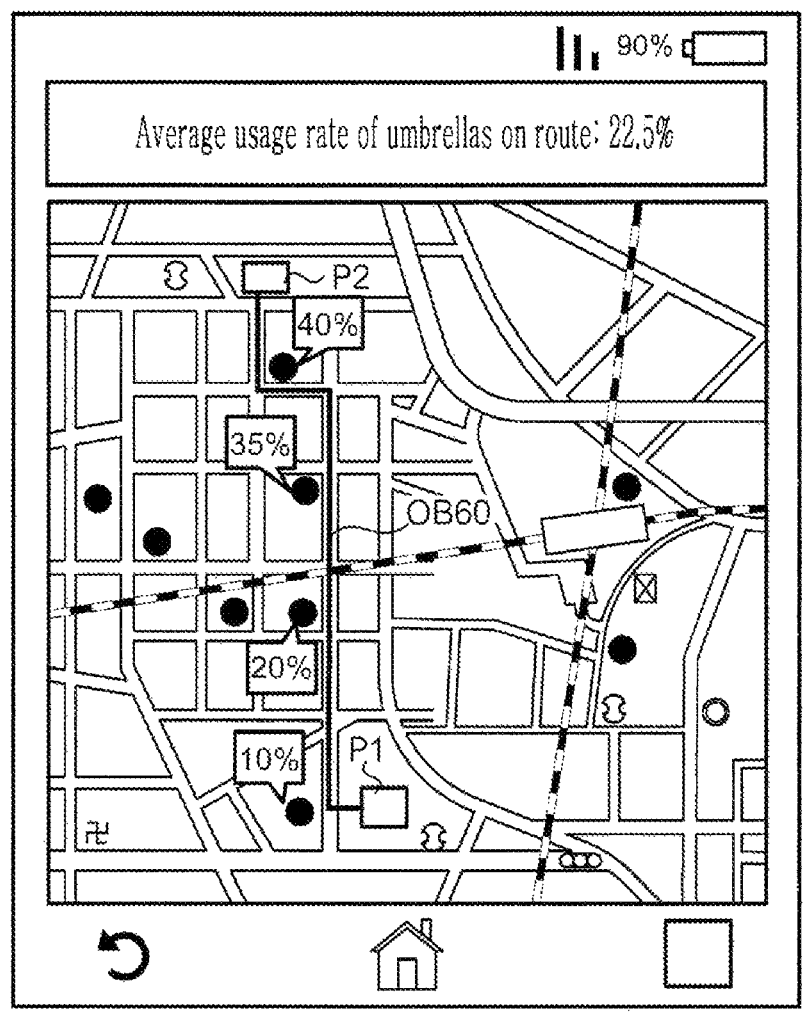
FIG. 9 shows an example (example 4) of information displayed on a display unit 330.

FIG. 9 shows another example of information displayed on a display unit 330. It is assumed that a user designates, in the map application program or the like, two points P1 and P2 as a departure point and a destination point, respectively. An analyzing unit 220 specifies a route from the point P1 to the point P2 designated from a user terminal 300, displays the route as object OB60, and also transmits position information (a set of the position information) representing the route to a server 200. The analyzing unit 220 specifies a plurality of cameras 100 in the vicinity of the route, and performs analysis on images acquired from the specified cameras 100 to generate situation information. Further, the analyzing unit 220 performs statistical processing on a plurality of pieces of generated situation information. For example, when numerical values are included in the situation information, an average value of the numerical values is calculated.

Upon acquiring situation information including the statistically processed situation information from the server 200, a display control unit 320 displays the situation information at a position corresponding to each camera 100, and also displays a message (in this example, a notification that a usage rate of the umbrellas on the route is 22.5% on average) based on a result of the statistical processing. According to this example, information according to the user's future action content is provided.

Figure 10:
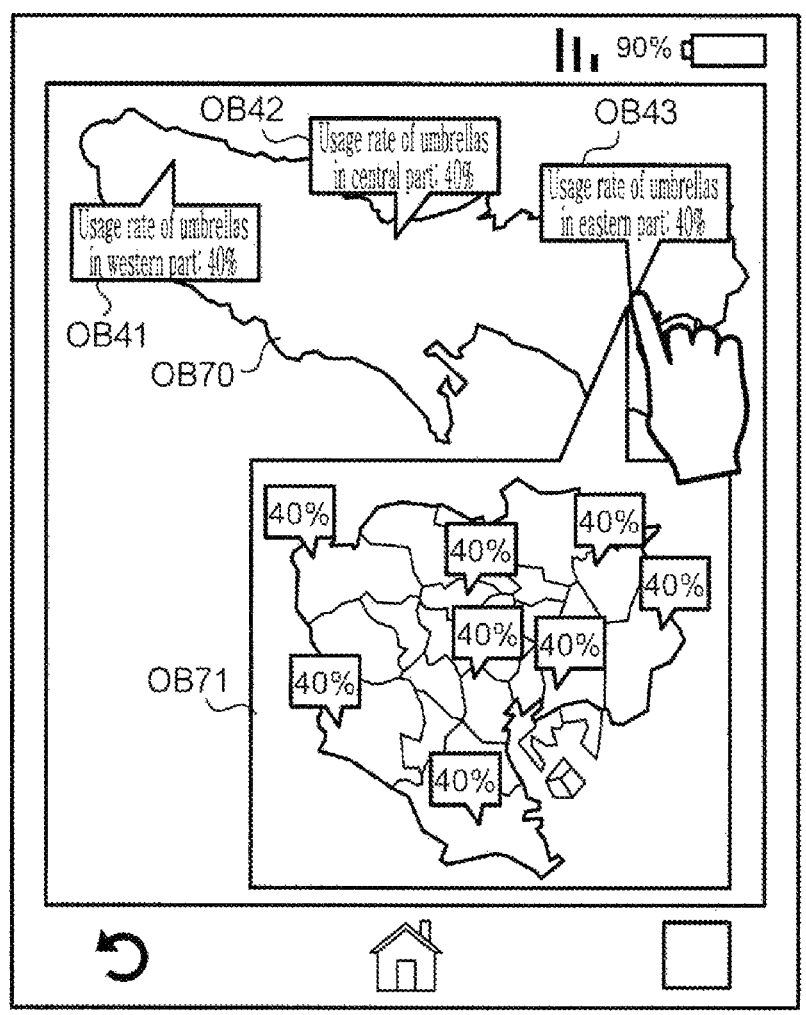
FIG. 10 shows an example (example 5) of information displayed on a display unit 330.

FIG. 10 shows another example of information displayed on a display unit 330. A user designates an area of "Tokyo" in a map application program or the like. An analyzing unit 220 selects a predetermined number (three in the drawing) of cameras 100 associated with the area of "Tokyo", generates situation information from images of the selected cameras 100, and transmits the situation information to a user terminal 300. In the user terminal 300, an object OB41 indicating each piece of the acquired situation information is displayed to be superimposed on an object OB70. In this state, when the user designates an object OB43 representing one partial area, the designation is transmitted to the server 200, and the situation information is generated from an image captured at a position associated with "eastern part" of Tokyo in the analyzing unit 220 and is transmitted to the user terminal 300. The user terminal 300 displays the situation information received from the server 200 on an enlarged map (an object OB71) of the eastern part. According to this example, it is possible to appropriately change (zoom in) a range of the situation information desired by the user.

Figure 11:
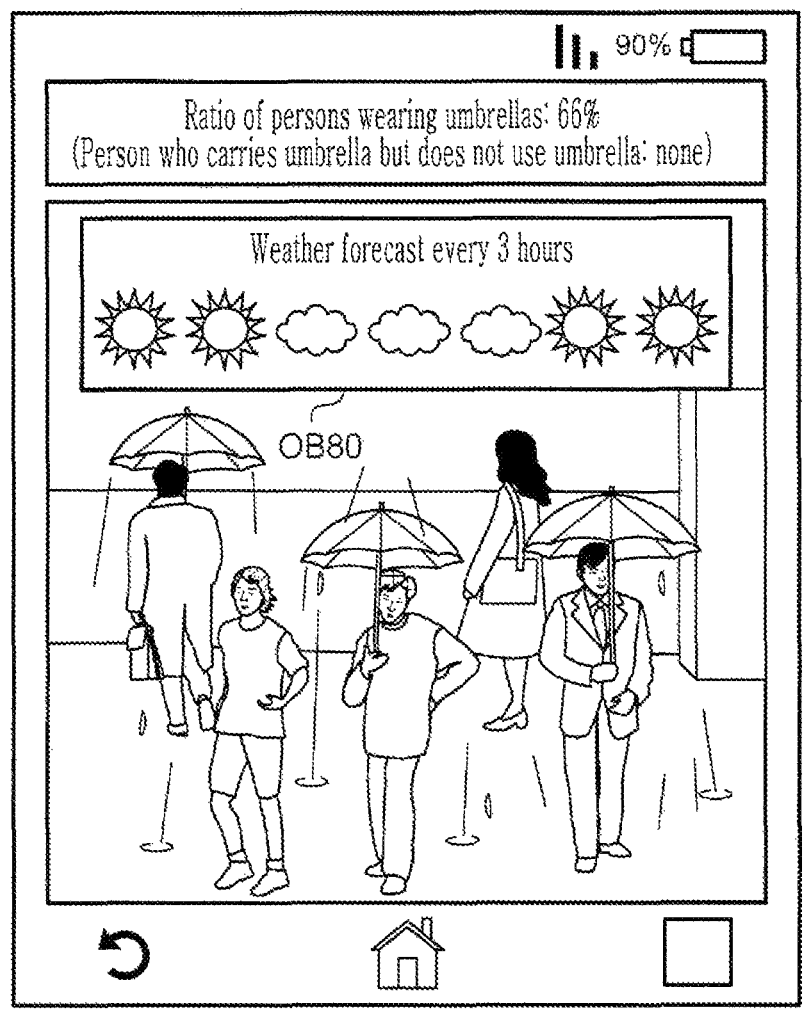
FIG. 11 shows an example (example 6) of information displayed on a display unit 330.

FIG. 11 shows another example of an image displayed on a display unit 330. In this example, an object OB80 based on the weather which a server 200 acquires from a weather database 400 is displayed to be superimposed on an image.

Figure 12:
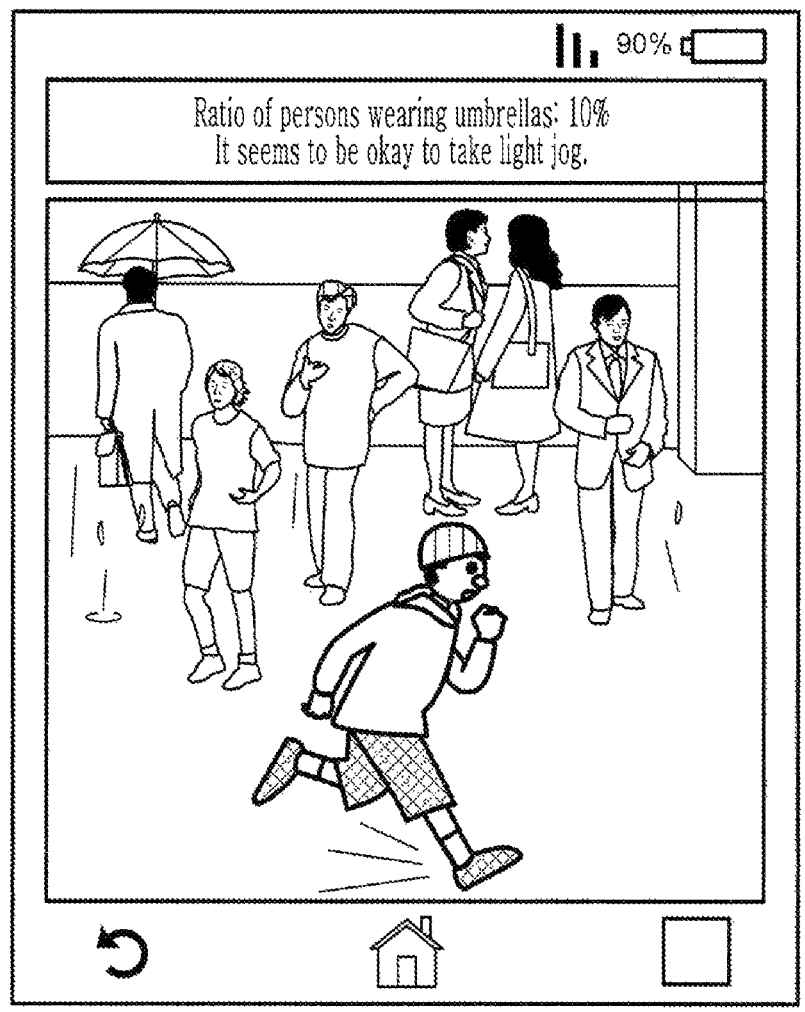
FIG. 12 shows an example (example 7) of information displayed on a display unit 330.

FIG. 12 shows an example (example 7) of information displayed on a display unit 330. In an analyzing unit 220, a movement (an action such as running, walking) of a person may be analyzed instead of static and instantaneous information of the person and may be reflected on situation information. For example, when detecting a person who is wearing an umbrella and a person who is running without wearing an umbrella from an image, a message saying "it seems to be okay to take a light jog" is generated. It is possible to consider the action content corresponding to the weather with a more realistic feeling by referring to behaviors of other persons.

Figure 8:
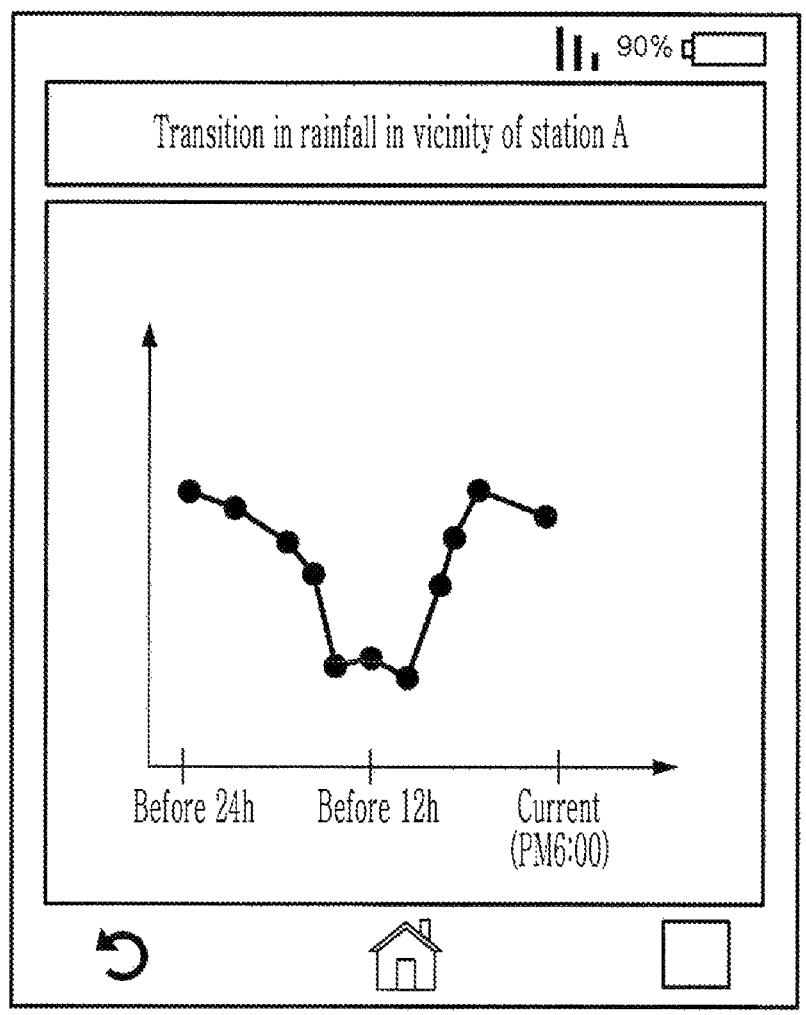
FIG. 8 shows an example (example 3) of information displayed on a display unit 330.
Figure 13:
FIG. 13 shows an example (example 8) of information displayed on a display unit 330.

FIG. 13 shows another example of information displayed on a display unit 330. When an analyzing unit 220 analyzes a usage situation of a rain gear (an inclination degree of an umbrella, deflection, whether it is blown, a degree of deformation, etc.), it is determined from the inclination degree of the umbrella that the wind is strong and a message saying a possibility that the umbrella is useless is generated, as shown in FIG. 8. The content of the message may be determined by further taking into consideration posture and movement of the person (for example, a bearing degree, a degree in which a hair flies).

Figure 14:
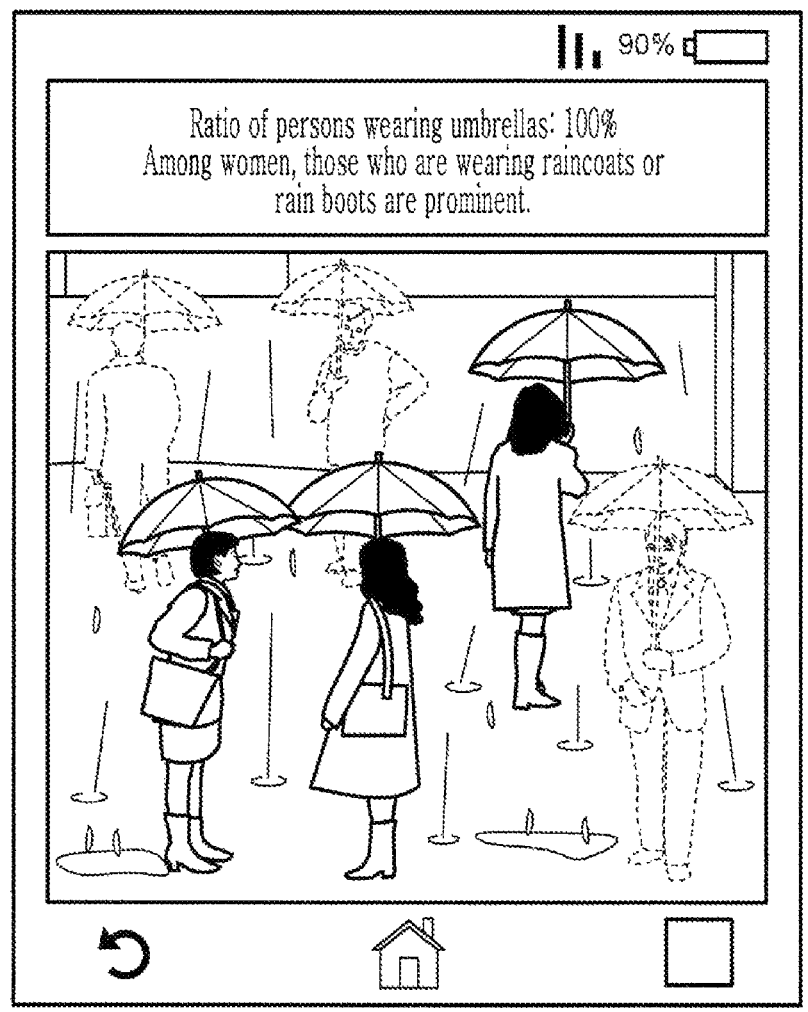
FIG. 14 shows an example (example 9) of information displayed on a display unit 330.

FIG. 14 shows another example of information displayed on a display unit 330. The display unit 330 edits situation information according to user information stored in a storage unit 350. For example, when attribute information of "female" is stored, the display unit 330 analyzes image data to determine the sex of each person, and performs image processing for cutting out only females and displays a message saying "female".

Alternatively, when the age is included as the user information, a message according to the age is generated. For example, even for the same situation information, for example, a message urging a user to carry an umbrella, such as "it would be better to carry an umbrella since persons wearing the umbrellas are found here and there" is generated for the user of sixties or more, but a message suggesting a possibility that an umbrella is unnecessary, such as "it seems to be okay now even without an umbrella" is generated for a teenage user. According to this example, the information to be provided is customized according to the attribute of the user.

Other Embodiments

A timing at which a server 200 acquires images from cameras 100 or a timing at which the server 200 executes image analysis is made arbitrarily. For example, each camera 100 may not spontaneously transmit image data to the server 200, and the server 200 may request the image data to the camera 100 in response to a request from a user terminal 300. Alternatively, an analyzing unit 220 may execute the image analysis in accordance with a predetermined schedule regardless of a timing of the request from the user.

Acquisition of captured images, analysis of images, and generation of situation information may be performed at a plurality of nodes, or may be executed at one node. For example, the server 200 may be omitted from the information providing system 10 and the user terminal 300 may have a function of the server 200.

To summarize, in an information providing system of the present invention, a step of acquiring an image captured by an image capturing apparatus via a network, a step of analyzing the acquired image to generate at least situation information indicating whether the captured person possesses a rain gear, a display step of displaying the generated situation information on the user terminal may be executed.

What is claimed is:

1. An information providing system, comprising:
   one or more processors that:
   acquire an image captured by a plurality of imaging devices provided at different places via a network;
   accept designation of a plurality of positions from a user terminal;
   analyze an image captured by one or more imaging devices corresponding to a plurality of designated locations, to generate situation information on a point on a route including the plurality of designated positions, the situation information at least indicating whether a captured person carries a rain gear; and
   display the situation information on the user terminal.

2. The information providing system according to claim 1, wherein the rain gear includes an umbrella.

3. The information providing system according to claim 1, wherein the one or more processors accept designation of an area, and display situation information on each of regions constituting the area.

4. The information providing system according to claim 1, wherein the situation information includes information indicating a ratio of a person carrying the rain gear among a plurality of captured persons.

5. The information providing system according to claim 1, wherein the situation information includes information indicating whether a person carrying the rain gear is using the rain gear.

6. The information providing system according to claim 1, wherein the one or more processors analyze the acquired image to further generate rainfall information indicating a degree of rainfall, and display the rainfall information on the user terminal.

7. The information providing system according to claim 6, wherein the degree of rainfall is determined based on a degree of wetting in a ground.

8. The information providing system according to claim 1, wherein the one or more processors acquire a plurality of images obtained by capturing a same point within a predetermined period, and generate situation information at a plurality of time points.

9. The information providing system according to claim 1, wherein the one or more processors acquire weather information via a network, and display the acquired weather information on the user terminal in addition to the situation information.

10. An information providing system, comprising:
one or more processors that:
acquire an image captured by an imaging device via a network;
analyze the image to generate situation information at least indicating whether a captured person carries a rain gear; and
display, on a user terminal including a storage device that stores attribute information of a user, the situation information edited based on the attribute information.

11. An information providing method, comprising:
acquiring an image captured by a plurality of imaging devices provided at different places via a network;
accepting designation of a plurality of positions from a user terminal;
analyzing an image captured by one or more imaging devices corresponding to a plurality of designated locations, to generate situation information on a point on a route including the plurality of designated positions, and the situation information at least indicating whether a captured person carries a rain gear; and
displaying the generated situation information on the user terminal.

12. A program stored on a non-transitory computer readable medium for causing a computer to execute to:
acquire an image captured by a plurality of imaging devices provided at different places via a network;
accept designation of a plurality of positions from a user terminal;
analyze an image captured by one or more imaging devices corresponding to a plurality of designated positions, to generate situation information on a point on a route including the plurality of designated positions, and the situation information at least indicating whether a captured person carries a rain gear; and
display the generated situation information on the user terminal.

13. An information providing method, comprising:
acquiring an image captured by an imaging device via a network;
analyzing the image to generate situation information at least indicating whether a captured person carries a rain gear; and
displaying, on a user terminal including a storage device that stores attribute information of a user, the situation information edited based on the attribute information.

14. A program stored on a non-transitory computer readable medium for causing a computer to execute to:
acquire an image captured by an imaging device via a network;
analyze the image to generate situation information at least indicating whether a captured person carries a rain gear; and
display, on a user terminal including a storage device that stores attribute information of a user, the situation information edited based on the attribute information.

15. The information providing system according to claim 1, wherein the one or more processors specifies one or more imaging devices in a vicinity of the route as the one or more imaging devices corresponding to the plurality of designated locations.

16. The information providing system according to claim 10, wherein the attribute information includes a sex of the user or an age of the user.

17. The information providing method according to claim 11, further comprising specifying one or more imaging devices in a vicinity of the route as the one or more imaging devices corresponding to the plurality of designated locations.

18. The program according to claim 12, wherein the computer further executes to specify one or more imaging devices in a vicinity of the route as the one or more imaging devices corresponding to a plurality of designated locations.

19. The information providing method according to claim 13, wherein the attribute information includes a sex of the user or an age of the user.

20. The program according to claim 14, wherein the attribute information includes a sex of the user or an age of the user.

* * * * *